(12) United States Patent
Sommer

(10) Patent No.: US 10,205,745 B2
(45) Date of Patent: Feb. 12, 2019

(54) METHOD FOR ADDRESSING, AUTHENTICATION, AND SECURE DATA STORAGE IN COMPUTER SYSTEMS

(71) Applicant: Ralf Sommer, Sinntal-Oberzell (DE)

(72) Inventor: Ralf Sommer, Sinntal-Oberzell (DE)

( * ) Notice: Subject to any disclaimer, the term of this patent is extended or adjusted under 35 U.S.C. 154(b) by 127 days.

(21) Appl. No.: 14/896,112

(22) PCT Filed: Jun. 3, 2014

(86) PCT No.: PCT/EP2014/061519
§ 371 (c)(1),
(2) Date: Dec. 4, 2015

(87) PCT Pub. No.: WO2014/195332
PCT Pub. Date: Dec. 11, 2014

(65) Prior Publication Data
US 2016/0127411 A1    May 5, 2016

(30) Foreign Application Priority Data

Jun. 5, 2013  (DE) ........................ 10 2013 105 781

(51) Int. Cl.
| | |
|---|---|
| H04L 29/06 | (2006.01) |
| G06Q 20/12 | (2012.01) |
| G06Q 20/32 | (2012.01) |
| G06Q 20/42 | (2012.01) |
| H04L 29/12 | (2006.01) |

(52) U.S. Cl.
CPC ......... *H04L 63/1458* (2013.01); *G06Q 20/12* (2013.01); *G06Q 20/3278* (2013.01); *G06Q 20/425* (2013.01); *H04L 63/0869* (2013.01); *H04L 63/0876* (2013.01);
(Continued)

(58) Field of Classification Search
CPC .. G06Q 20/20; G06Q 20/322; G06Q 20/3274; G06Q 20/3278; G06Q 20/02; G06Q 20/18; G06Q 20/382; G06Q 20/401; G06Q 20/4012; G06Q 20/40975; G06Q 20/12; G06Q 20/425; H04L 63/1458; H04L 63/0869; H04L 63/0876; H04L 63/1441; H04L 63/18; H04L 63/61; H04L 63/2076; H04L 61/1511
See application file for complete search history.

(56) References Cited

U.S. PATENT DOCUMENTS

| | | | |
|---|---|---|---|
| 6,763,020 B1 | 7/2004 | Hon | |
| 2003/0195846 A1* | 10/2003 | Felger | H04M 15/68 705/40 |

(Continued)

FOREIGN PATENT DOCUMENTS

| | | |
|---|---|---|
| DE | 102004029568 A1 | 1/2006 |
| DE | 102004059542 A1 | 6/2006 |

(Continued)

*Primary Examiner* — Chau Le
(74) *Attorney, Agent, or Firm* — Loginov & Associates, PLLC; William A. Loginov

(57) ABSTRACT

A method which facilitates the secure addressing and authentication for the establishment of connections as well as the secure storage of data and the avoidance of the issue of data to third parties. Furthermore it enables secure payment via data links. Thus it relates in particular a method for addressing, authentication and data storage for "Private Cloud" networks and secure payment via data links.

25 Claims, 3 Drawing Sheets

(52) U.S. Cl.
CPC ......... *H04L 63/1441* (2013.01); *H04L 63/18* (2013.01); *H04L 61/1511* (2013.01); *H04L 61/2076* (2013.01)

(56) References Cited

U.S. PATENT DOCUMENTS

| | | | |
|---|---|---|---|
| 2003/0200184 A1 | 10/2003 | Dominguez et al. | |
| 2004/0004958 A1* | 1/2004 | Wang | H04L 12/14 370/352 |
| 2004/0068473 A1* | 4/2004 | Cooper | G06F 21/6254 705/75 |
| 2005/0027818 A1* | 2/2005 | Friedman | H04L 29/06 709/217 |
| 2005/0286510 A1* | 12/2005 | Nakajima | H04L 12/2856 370/386 |
| 2006/0294387 A1 | 12/2006 | McCracken et al. | |
| 2007/0095887 A1* | 5/2007 | Barbosa | G06Q 10/06 235/375 |
| 2008/0159266 A1* | 7/2008 | Chen | H04L 29/12896 370/352 |
| 2008/0295144 A1* | 11/2008 | Cam-Winget | H04L 63/08 726/1 |
| 2009/0158403 A1* | 6/2009 | Benschop | G06F 21/606 726/5 |
| 2009/0192937 A1* | 7/2009 | Griffin | G06Q 20/10 705/42 |
| 2010/0030839 A1* | 2/2010 | Ceragioli | H04L 63/20 709/201 |
| 2010/0197293 A1 | 8/2010 | Shem-Tov | |
| 2010/0239077 A1 | 9/2010 | Michaelis et al. | |
| 2010/0310061 A1 | 12/2010 | Lin et al. | |
| 2013/0074176 A1* | 3/2013 | Nishihata | H04L 63/0272 726/15 |
| 2014/0344157 A1* | 11/2014 | Suitner | G06Q 20/383 705/44 |
| 2015/0081462 A1* | 3/2015 | Ozvat | G06Q 20/027 705/21 |

FOREIGN PATENT DOCUMENTS

| | | |
|---|---|---|
| EP | 1515506 A1 | 3/2005 |
| WO | 2012135563 A1 | 10/2012 |

\* cited by examiner

METHOD FOR ADDRESSING, AUTHENTICATION, AND SECURE DATA STORAGE IN COMPUTER SYSTEMS

FIELD OF THE INVENTION

The invention relates to a method which facilitates the secure addressing and authentication for the establishment of connections as well as the secure storage of data and the avoidance of the issue of data to third parties. Furthermore the invention enables secure payment via data links. Thus it relates in particular a method for addressing, authentication and data storage for "Private Cloud" networks and secure payment via data links.

BACKGROUND

According to the current state of the art there are nowadays two widespread methods for addressing computer systems on the internet, namely DNS service or the addressing of permanently assigned IP addresses. Dynamic IP addresses, such as are assigned by the majority of internet service providers to the client devices, can only be used via internet services (e.g. DynDNS.org, NoIP.com, Selfhost.de, TZODNS.com or dynamic DNS services of the internet service provider) for addressing a specific computer system. In this case a computer system should be understood for example to be an internet router, smartphone, server, personal computer, laptop, notebook, tablet PC etc.

The aforementioned methods enable potential attackers from the internet to attack the computer systems via DNS or the IP address. In this case monitoring can potentially be obtained via the computer systems or so-called DOS (denial of service) attacks on these computer systems can be carried out. In the case of dynamic DNS services it is also possible for the access data for the dynamic DNS service to be stolen. As a result it would be possible for an attacker to divert the dynamic DNS address to another computer system, in order then to capture the accesses by the users to this address.

It is known to transmit the IP address via a telephone connection. In this connection, however, it is not possible to rule out the use of a falsified caller ID (telephone number). However, this abuse is not discernible, and thus the transmission of the IP address is not secure. Nowadays a user name and password are generally used for authentication. Furthermore, in banking businesses chip cards and one-time passwords, so-called TANs or smsTANs, are used. The disadvantage in the authentication by means of a user name and password is that for different target systems the user must in each case create his own user name and passwords. Often for reduction of the number of passwords a common password is created for different target systems.

In this connection the problem arises that through the theft of this common password an attacker can attack a plurality of the user's target systems in order for example to manipulate or to capture data or in order to make purchases in the name of and for the account of the user. Furthermore, the user generally also has no possibility of verifying how securely the access data are stored in the respective target system.

Smart cards and one-time passwords (TAN/smsTAN) for banking business can be misused by technical processes. Thus there are already known cases in which smsTANs have been collected and misused. With wireless connections such as for example NFC, Bluetooth, WLAN etc. there is a risk that the connection set-up and the wireless transmission of data are intercepted by attackers. This results in a large number of possibilities for attack in order to obtain access to the computer systems or in order to misuse the data.

According to the current state of the art, user data are frequently stored on a plurality of extraneous computer systems. Thus for purchases via the internet it is generally necessary to store the user name, password and the account or credit card data on the website of the respective online retailer. In the case of social networks personal and private data are to a large extent transmitted to an extraneous computer system, sometimes even with the proviso that these data may be used by the provider of the social network. However, cases are continually becoming known in which user data have been stolen and wrongfully used by hackers. Thus in May 2011 millions of personal data, also including passwords and credit card numbers were stolen in an attack by hackers on data processing systems belonging to Sony.

In payment processes via the internet, account data or credit card data must generally be communicated to the vendor or the online shop. In most cases these data are stored in the vendor's computer systems. Here too, the user generally has no possibility of verifying how securely the data are stored in the vendor's computer systems. There are a large number of cases in to which these data have been stolen and wrongfully used. In such cases the data have been stolen by attackers both outside and inside these firms.

BRIEF SUMMARY OF THE INVENTION

The present invention seeks to overcome the disadvantages of the state of the art described above and to provide a method which is particularly simple and cost-effective to carry out and which enables secure addressing and authentication for connections between different computer systems such as for example internet routers, smartphones, servers, personal computers etc. as well as secure storage of personal data, so that output of data to third parties is avoided. Furthermore the invention should enable secure payment for online purchases via the internet or for purchases in shops.

This object is achieved in that computer systems communicate not only via a network interface, that is to say for example an Ethernet, NFC, Bluetooth, WLAN, or LAN interface but also via a telephony interface with associated telephone number. The method according to the invention serves for addressing, authentication and secure data storage in computer systems with at least one network interface and at least one telephony interface as well as at least one storage space for administrative information, in particular for authorized call numbers and subscriber PINs in such a way that the computer systems are programmed with a program reproducing a control logic for controlling the interaction of the aforementioned interfaces. The method comprises at least the following steps:

a) transmitting the connection information for the network interface of a first computer system via the telephony interface to a second computer system;

b) checking a call number of the first computer system with the call numbers stored in the at least one storage space in the second computer system and, if the outcome of the check is positive, transmitting the connection information for the network interface of the second computer system via the telephony interface to the first computer system as well as activating the network interface of the second computer system, in order to accept connections on the basis of the connection information of the first computer system;

c) checking the call number of the second computer system with the call numbers stored in the at least one storage space in the first computer system and, if the outcome of the check is positive, activating the network interface of the first computer system, in order to establish a connection on the basis of the connection information of the second computer system; wherein d) the network interface of the second computer system is configured in such a way that only connections with the connection information of the first computer system are authorized, and e) the network interface of the first computer system is configured in such a way that only connections with the connection information of the second computer system are authorized, and f) the network interfaces of the first and second computer system only allow connection attempts with the respective connection information for a short predetermined time period and after the connection is established or after the predetermined time period has elapsed without a connection being established these network interfaces are not recognizable or reachable for other computer systems.

By the clearly defined assignment and reciprocal authentication by means of stored call numbers or user information, misuse, for example using call numbers and/or IP addresses which have been falsified or in some other way wrongfully acquired, cannot take place.

The method can also be used in systems with three computer systems used are being. If in a preferred variant of the method two computer systems provided for communication area already connected to a third computer system and if by means of the control logic in the third computer system a direct connection is to be established via the network interface, the method advantageously comprises the following further steps:

g) transmitting to the second computer system the connection information for the telephony interface and network interface of the first computer system with a system message via the existing connection to the a third computer system;

h) checking a call number of the first computer system with call numbers stored in the storage space of the second computer system and, if the outcome of the check is positive, transmitting to the first computer system the connection information for the telephony interface and network interface of the second computer system via the existing connection to the third computer system and activating the network interface of the second computer system, in order to accept connections on the basis of the connection information of the first computer system; and i) checking the call number of the second computer system with the call numbers stored in the storage space in the first computer system and, if the outcome of the check is positive, activating the network interface of the first computer system, in order to establish connections on the basis of the connection information of the second computer system; wherein j) the network interface of the second computer system only allows connections with the connection information of the first computer system;

k) the network interface of the first computer system only allows connections with the connection information of the second computer system, and l) the network interfaces of the first and second computer system only allow connection attempts with the respective connection information for a short predetermined time period and after the connection is established or after the predetermined time period has elapsed without a connection being established these network interfaces are not recognizable or reachable for other computer systems.

The method is advantageously modified in that in step b) and/or h) the network interface of the second and/or third computer system is activated in order to establish connections on the basis of the connection information of the first computer system, and that in step c) and/or i) the network interface of the first computer system is activated in order to accept connections on the basis of the connection information of the second and/or third computer system.

A variant of the method which is regarded as favorable provides that after a connection is established the second and/or third computer system requests an identification of the first computer system, compares it with the identification tag stored in the storage space of the second and/or third computer system, and if the outcome of the check is positive the connection remains activated and if the outcome of the check is negative the connection is closed and in particular an alarm notification is output.

The method is modified in that after a configurable number, in particular after between 1 and 15, preferably between 2 and 12, in particular preferably between 3 and 10 negative identification attempts, the call number of the first computer system in the storage space of the second and/or third computer system is marked as blocked by the control logic and no more connection information is accepted for the first computer system with this call number.

According to the invention it is provided that the identification tag is a text, a biometric tag, an electronic key or a mechanical key, of which the key information is read by a reading device on the first computer system.

A preferred embodiment of the method provides that the first computer system supplies a security token with the connection information to the second and/or third computer system, and this security token is transmitted when the connection is established via the network interface and is checked by the control logic with feedback in the first computer system, and if the outcome of the check is positive the connection remains activated and if the outcome of the check is negative the connection is closed and in particular an alarm notification is output.

It is regarded as favorable if, after a predetermined number of negative connection attempts, the call number of the second and/or third computer system in the storage space of the first computer system is marked as blocked by the control logic and no more connection attempts are undertaken for the second and/or third computer system with this cal number.

It proves advantageous if a first and a second computer system, which are in each case already connected to a third computer system and have established a direct connection, are only authenticated reciprocally by means of the common third computer system, and in this case the method comprises the following further steps:

m) the first computer system requests a security token from the third computer system via the connection and sends this on to the second computer system via the direct connection;

n) the second computer system passes on the security token to the third computer system via the connection;

o) the third computer system compares the two security tokens and in each case sends a system message with the result of the comparison to the first and second computer systems, and p) the control logic in each case of the first and of the second computer system checks the system message with the result of the comparison and when the outcome of the check is positive it leaves the connection open and when the outcome of the check is negative it closes the direct connection and outputs an alarm message.

An embodiment of the aforementioned method provides that in each case a first and a second computer system are provided in order to carry out a payment process of a purchaser by means of a first computer system and of a vendor by means of a second computer system. In this case the payment process can also be carried out for example by means of a third computer system for example of a payment service. In this variant the method advantageously comprises the further steps, wherein q) the control logic in the vendor's computer system generates a security token, and the purchaser or the purchaser's computer system receives the security token, preferably together with payment information, via the direct connection from the vendor or the vendor's computer system;

r) the vendor or the vendor's computer system passes on the payment information via the connection together with the security token to a payment service or a computer system of the payment service;

s) the purchaser or the purchaser's computer system passes on the payment information together with the security token via the connection to a payment service or the computer system of the payment service;

t) the purchaser or the purchaser's computer system passes on the payment information together with the security token via the connection to a payment service or the computer system of the payment service;

u) a control logic in the payment service or in the computer system of the payment service compares the security token from the vendor or the vendor's computer system and from the purchaser or the purchaser's computer system and validates the PIN of the purchaser or of the purchaser's computer system and when the outcome of the check is positive it concludes the payment process and sends back a positive system message to the vendor or the vendor's computer system and to the purchaser or the purchaser's computer system. On the other hand, when the outcome of the check is negative the payment process is interrupted and a negative system message is sent back to the vendor or the vendor's computer system and to the purchaser or the purchaser's computer system of the purchaser.

The method as set out above is modified in that for the payment process between the vendor or the vendor's computer system and the purchaser or the purchaser's computer system in a shop or the like the connection is established via NFC, Bluetooth, wireless LAN or wired LAN.

In this case it has proved advantageous if for the payment process the payment information is transmitted between the vendor or the vendor's computer system and the purchaser or the purchaser's computer system in a shop or an online shop, not via a direct connection, but via an optical signal (for example Q/R code, barcode, character strings, . . . ), an acoustic signal (for example modem tones, speech, . . . ) or by manual input between the vendor or the vendor's computer system and the purchaser or the purchaser's computer system. In this case for online purchasing a second device (1a2, for example a smartphone) can also be used to receive and transmit the payment information from a first device (1a1—for example a PC or notebook). In this context the first device (for example PC or notebook) takes on the role of a terminal of the vendor or of the vendor's computer system.

In an advantageous modification the method provides that the data for the payment process between the vendor or the vendor's computer system and the payment service or the computer system of the payment service, or between the purchaser or the purchaser's computer system and the payment service or the computer system of the payment service, can also be transmitted by the control logic for example via existing network connections which have not been produced as previously stated.

A text, a biometric tag, an electronic key or a mechanical key, of which the key information is read by a reading device in the computer systems, is advantageously used for the encryption, identification by PIN, security token and authorization.

It is advantageous if for small quantities of data, in particular for a payment process, the control logic transmits at least a part of the data captured in the preceding steps via the telephony interface.

It is also regarded as favorable if upon activation of a predetermined signal the control logic passes on data, in particular emails, SMS and FAX to computer systems without the aid of other internet services such as DNS and DynDNS.

An embodiment of the method provides that the control logic carries out an automatic check as to whether the displayed call number corresponds to the actual subscriber connection.

An embodiment of the method provides that connection requests from a first computer system are distributed by the control logic in a second and/or third computer system to different second and/or third computer systems according to a predetermined criterion, in particular to a number of connections and/or a utilization and/or an availability of the second and/or third computer systems and/or a call number and/or a geographical location.

An embodiment of the method provides that a computer system in a server role in the network processes connection requests or requests for name resolution (for example DNS requests, . . . ) from further computer systems in the network through the control logic, and the control logic of the first computer system carries out the exchange of the connection information with a second and/or third computer system as stated above and then produces the connection or sends back the connection parameters (for example IP address, port number, . . . ) to the requesting computer systems.

An embodiment of the method provides that the control logic of a computer system also passes on the connection parameters determined according to the preceding claims to at least one further server system (for example firewall, . . . ) and this then allows the connections of the computer system or of the computer systems from the network with these connection parameters.

An embodiment of the method provides that the control logic of the second and/or third computer systems automatically passes on or makes available information and control data to the first computer systems as a function of the connection information.

An embodiment of the method provide that the call number of the second and/or third computer system is used for another or existing telephony service, in particular a fax service and/or an answering machine, and the control logic of the second and/or third computer system compares the call number of the first computer system with the call numbers stored in the storage space of the second and/or third computer system and in the event of conformity it does not activate the telephony service, but communicates the connection data for the second and/or third computer system to the first computer system.

In a preferred modification of the method it is provided that the element designated as a telephony interface is alternatively also provided by optical signals (for example Q/R code, barcode, character strings), acoustic signals (for example modem tones, speech), by manual inputs or by secure connections previously produced in another way (for example NFC, Bluetooth, WLAN, USB, . . . ) with the same action. For computer systems 1, 1a, 1a1, 1a2, 1b which lie geographically close together the connection information for the network interface 11 can then be transmitted by means of these signals (for example Q/R code, barcode, character strings), acoustic signals (for example modem tones, speech, or the like), manual inputs or by the secure connections previously produced in another way (for example NFC, Bluetooth, WLAN, USB, . . . ) between the computer systems 1, 1a, 1a1, 1a2, 1b. Communication can then preferably also take place bidirectionally.

According to the invention provision is also made for the use of the method as set out above with protocols of other connection-orientated interfaces, in particular with NFC, Bluetooth and WLAN protocols.

By a control logic for the interaction of telephony and network interfaces the invention provides a novel and secure variant for establishment of connections between computer systems, in particular also in the field of wireless communication such as NFC, Bluetooth, WLAN, etc. Many of the above-mentioned computer systems nowadays already have both types of connection, i.e. telephony and network interface, or can be equipped therewith by additional hardware and/or software modules.

A significant point of the solution according to the invention is that for the addressing and authentication a part of the connection information is transmitted via the telephone system will. Connection information may for example be TCP/IP addresses, TCP/IP ports, user names, locations, etc. For this purpose the invention uses the respective telephony protocols and services such as for example the D channel in the case of ISDN, a tone/modem connection. SMS, and/or fax services. The above-mentioned computer systems use this connection information in order to check whether the data have been transmitted with an authorized call number. Thus after a check with a positive outcome a data connection can then be produced.

For computer systems which only have a dynamic IP address or for wireless systems, the invention hereby offers a novel possibility for connecting these computer systems without the aid of an additional service such as for example DynDNS or vulnerable wireless connection set-up processes. For computer systems without special security requirements, such as for example a company's information pages, this method can also be used without further authentication in order to facilitate access to these computer systems.

A significant further point of the solution according to the invention is that the listeners of the network interface are only activated for a short time period (a few seconds) and in this case only react to connection data which have previously been transmitted by telephony interface. In this case a listener should be understood to be an interface or service to which a computer system can establish a connection. After the connection is established or after a predetermined time period has elapsed ("timeout") without a connection being established the computer systems are not recognizable or reachable for other computer systems.

Checking of the call numbers of the particular computer system by the control logic offers an additional preselection of allowed accesses. Moreover, due to the reciprocal dialing of the call numbers by the computer systems it is possible to prevent a connection from being established to a transmitted call number which does not correspond to a subscriber. As far as possible this prevents unauthorized access attempts by attackers via the telephony interface or the network interface.

Furthermore in the case of larger installations a distribution of computer systems to different second computer systems takes place by means of the control logic according to a predetermined criterion such as for example the number of connections, capacity, availability of the second computer systems, call number and/or a geographical location.

By the evaluation of the geographical or location-based data from the connection data the control logic of a computer system can select an optimal connection such as for example Bluetooth, WLAN, internet etc. or allow the user a selection of the possible connections.

For the connection set-up the invention provides at least three methods which will be explained in greater detail below with reference to the appended drawings. In this case the same or equivalent parts are provided with the same reference numerals.

DETAILED DESCRIPTION

Figure 1:
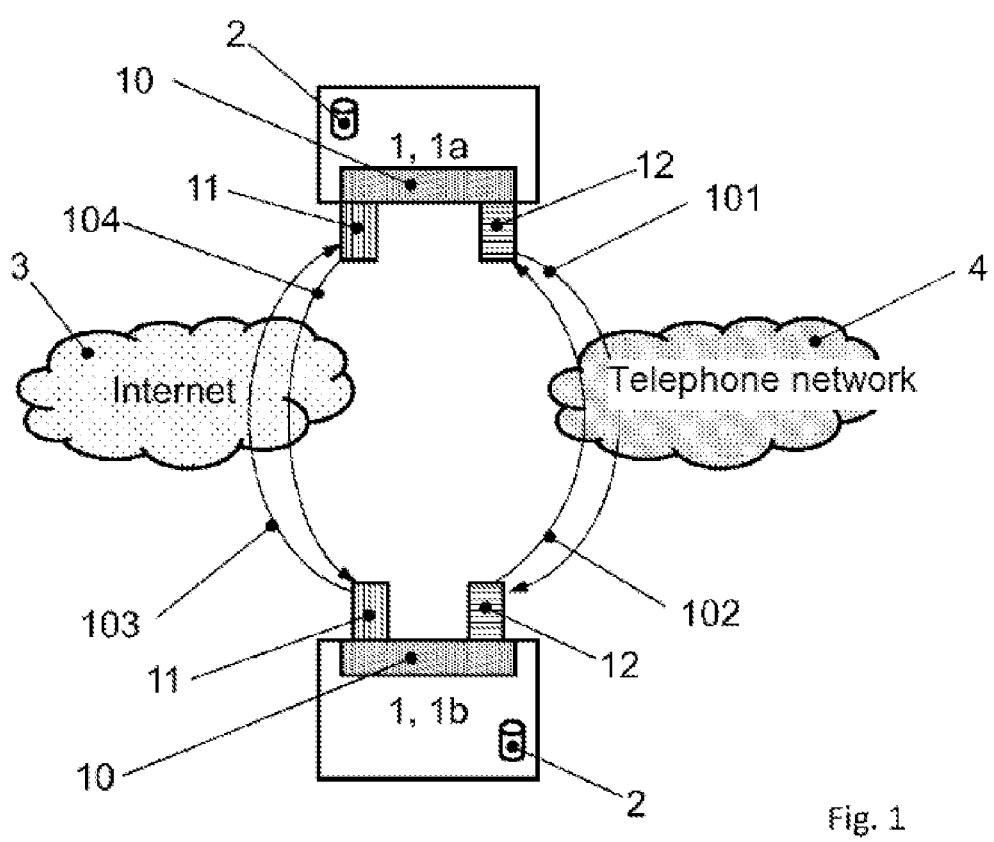
FIG. 1 shows a schematic representation of a client-server connection according to the invention with a server and a client.

FIG. 1 shows a schematic representation of a client-server connection according to the invention with a server 1, 1b, which in the context of the invention has also been designated previously as a second and/or third computer system, and a client 1, 1a, which in the context the invention has also been designated previously as a first computer system. In this case the server connection is established by means of a control logic 10, in which the first computer system 1a initially transmits the connection information from the first computer system 1a to the second computer system 1b by means of a telephony interface 12 and a first connection 101 via the telephone network 4. After a check with a positive outcome the second computer system 1b transmits the connection information from the second computer system 1b to the first computer system 1a via a second connection 102. The first computer system 1a activates a network interface 11 after a check with a positive outcome. The network interface 11 of the first computer system 1a only remains active up to the third connection 103 of the second computer system 1b or until a timeout elapses. The second computer system 1b establishes the third connection 103 to the network interface 11 of the first computer system 1a. At the request of the second computer system 1b the first computer system 1a transmits a PIN.

The client connection takes place in such a way that the first computer system 1a transmits the connection information from the first computer system 1a to the second computer system 1b via a first connection 101. After a check with a positive outcome the second computer system 1b transmits the connection information from the second computer system 1b to the first computer system 1a via a second connection 102. The second computer system 1b activates the network interface 11, which only remains active up to the fourth connection 104 of the first computer system 1a or until a timeout elapses. After a check with a positive outcome the first computer system 1a establishes the fourth connection 104 to the network interface 11 of the second computer system 1b. At the request of the second computer system 1b the first computer system 1a transmits a PIN.

Figure 2:
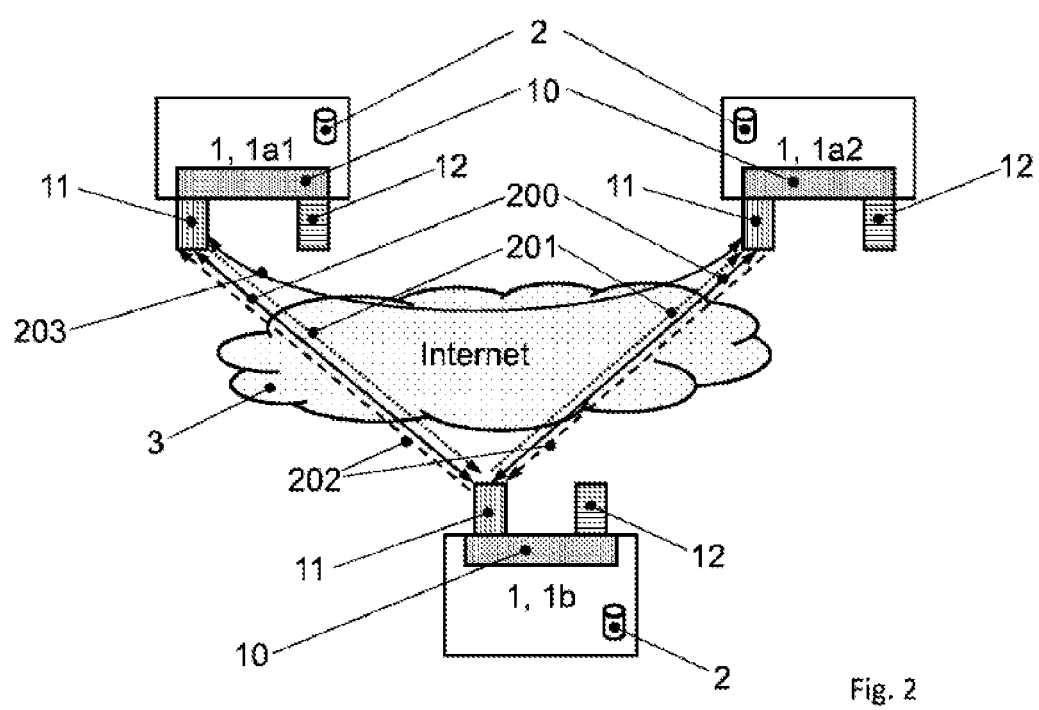
FIG. 2 shows a schematic representation of a client-server connection according to the invention with a server and two clients.

FIG. 2 shows a schematic representation of a client-server connection according to the invention with a third computer system designated as a server 1, 1b and two computer systems, more precisely a first 1, 1a1, and a second computer system 1, 1a2, designated as a client 1, 1a1, 1, 1a2. A first computer system 1, 1a1 may establish a connection 203 to a second computer system 1, 1a2. Both computer systems 1, 1a1, 1, 1a2 are already connected to a common third computer system 1, 1b via an existing connection 200. From this common third computer system 1, 1b the two computer systems 1, 1a1, 1, 1a2 have already received at least a part of the respective connection information via a system message from the third computer system 1, 1b.

The first computer system 1, 1a1 sends, via the third computer system 1, 1b, a system message with the complete connection information from the first computer system 1, 1a1 to the second computer system 1, 1a2. After a check with a positive outcome the second computer system 1, 1a2 sends back, via the third computer system 1, 1b, the complete connection information (with optional security token) from the second computer system 1, 1a2 and waits for the direct connection of the first computer system 1, 1a1 via the network interface 11. Finally, the second computer system 1, 1a2 activates the network interface 11.

The network interface 11 of the second computer system 1, 1a only remains active up to the connection 203 of the first computer system 1, 1a1 or until a timeout elapses. After a check with a positive outcome the first computer system 1, 1a1 establishes the direct connection 203 to the second computer system 1, 1a2, wherein the first computer system 1, 1a1 supplies the optional security token, if applicable, which is checked by the second computer system 1, 1a2. Optionally for the first computer system 1, 1a1 input of a PIN may be requested by the second computer system 1, 1a2.

Advantages of this method are inter alia that a restriction of access to previously registered call numbers is possible. Moreover the network interface 11 is only active for a short time and reacts only to the connection data, such as for example IP address, ports, interface data for NFC, Bluetooth, WLAN, etc., transmitted via the telephony interface 12. Thus no unauthorized access is possible. In particular no DOS attacks are possible, since the network interface 11 is only active for a short time and reacts only to previously transmitted connection data, such as for example IP address, ports, interface data for NFC, Bluetooth, WLAN, etc. Furthermore, both the first and second computer systems 1a, 1a1, 1a2 and also the third computer system 1, 1b have no continuously active network interfaces 11 and thus are not recognizable or reachable for attacks from the internet. In personal private network cloud connections, in which only devices belonging to one person are networked to one another, there is no possibility of access to the data for third parties.

Figure 3:
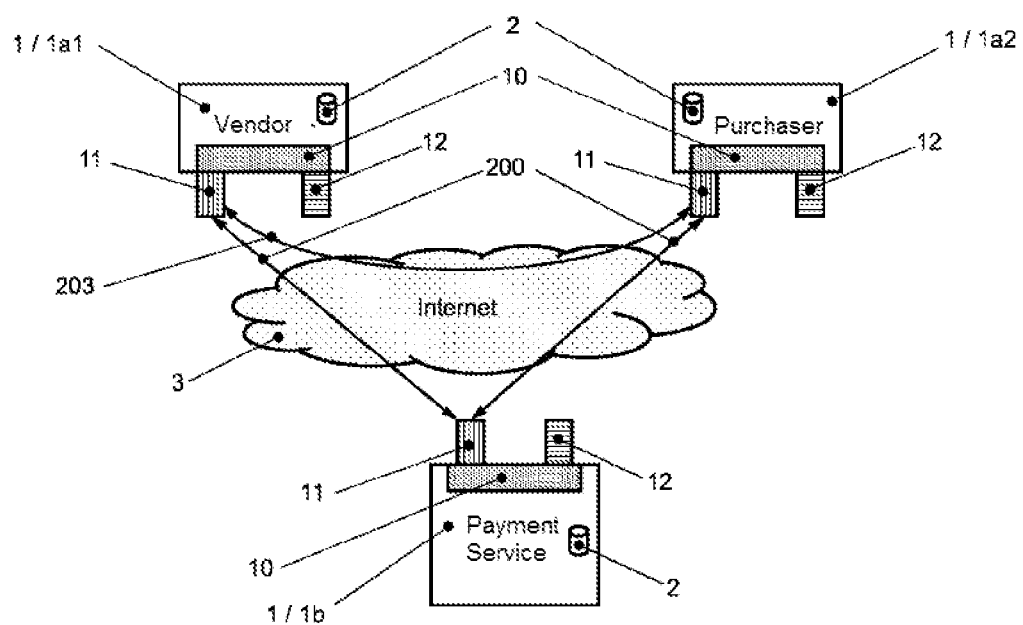
FIG. 3 shows a schematic representation of a client-server connection according to the invention with two clients for explanation of a purchasing process.

FIG. 3 shows a schematic representation of a client-server connection according to the invention with two clients for explanation of a purchasing process. For payment processes the invention uses a combination of the aforementioned methods for establishing the connection. In this case a computer system designated as a payment service 1b, in which both a first computer system designated as vendor 1a1 and also a second computer system designated as purchaser 1a2 must register beforehand, functions as the third computer system 1, 1b from the aforementioned method. In the payment process a communication ring consisting of vendor 1a1<=>purchaser 1a2<=>payment service 1b<=>vendor 1a1" is set up by the control logic 10.

In this case the payment sequence on the internet 3 extends for example in such a way that the purchaser 1a2 makes a purchase in an online shop of a vendor 1a1 in which a shopping basket is used. For the payment process the purchaser 1a2 authenticates himself with the payment service 1b by telephone, and the vendor 1a1 transmits a security token and the payment information for the payment process to the purchaser 1a2 via an internet connection. The purchaser 1a2 subsequently authorizes the payment process using a PIN with the payment service 1b and the vendor 1a1 authenticates himself with the payment service 1b. The vendor 1a1 also transmits the security token and the payment information to the payment service 1b. Finally the payment service 1b validates the security token from the purchaser 1a2 and vendor 1a1 and the PIN from the purchaser 1a2. If the outcome of the check is positive a return message for payment release is sent from the payment service 1b to the purchaser 1a2 and the vendor 1a1. The payment process is completed.

The payment sequence in a local shop proceeds in such a way that the purchaser 1a2 makes a purchase and authenticates himself for the payment process at the checkout by (mobile) telephone with the payment service 1b. The vendor 1a1 transmits a security token for the payment process and the payment information to the purchaser 1a2, for example by NFC, Bluetooth or wireless LAN, optionally also by a wired LAN. The purchaser 1a2 authorizes the payment process using a PIN with the payment service 1b and the vendor 1a1 authenticates himself with the payment service 1b. The vendor 1a1 also transmits the security token and the payment information to the payment service 1b, which in turn validates the security token of the purchaser/vendor and the PIN from the purchaser 1a2. If the outcome of the check is positive a return message for payment release is sent from the payment service 1b to the purchaser 1a2 and the vendor 1a1. A text, a biometric tag, an electronic key or a mechanical key, of which the key information is read for example by a reading device in the computer systems 1a, 1a1, 1a2, 1b, can be used for the encryption, identification by PIN, security token and authorization.

Advantages of this method are inter alia that in the complete payment sequence no payment-specific data such as bank sort code, account number, credit card number, PIN, etc. are transmitted to the vendor 1a1 or stored by the vendor 1a1. Accordingly these also cannot be stolen.

Moreover two independent points (purchaser 1a2 and vendor 1a1) have to be registered and logged in with the payment service 1b. This prevents payment processes to unknown third parties. The payment process is therefore secure both for the purchaser 1a2 and also for the vendor 1a1. It is not possible for third parties to influence or to misuse the communication ring unnoticed.

Thus the invention provides a method for addressing, authentication and secure data storage in computer systems 1, 1a1, 1a2, 1b with at least one network interface 11 and at least one telephony interface 12 and a storage space 2 for administrative information, in particular for authorized call numbers and subscriber PINs in such a way that the computer systems 1, 1a1, 1a2, 1b are programmed with a program reproducing a control logic 10 for controlling the interaction of the aforementioned interfaces 11, and the method comprises the following steps: a) transmitting the connection information for the network interface 11 of a first computer system 1a via the telephony interface 12 to a second and/or third computer system 1b; b) checking a call number of the first computer system 1a with the call numbers stored in the storage space 2 in the second and/or third computer system 1b and, if the outcome of the check is positive, transmitting the connection information for the network interface 11 of the second and/or third computer system 1b via the telephony interface 12 to the first computer system 1a and activating the network interface 11 of the second and/or computer system 1b, in order to accept connections 104 on the basis of the connection information of the first computer system 1a; c) checking the call number of the second and/or third computer system 1b with the call numbers stored in the storage space 2 in the first computer system 1a and, if the outcome of the check is positive, and activating the network interface 11 of the first computer system 1b, in order to establish a fourth connection 104 on the basis of the connection information of the second and/or third computer system 1b.

According to the invention d) the network interface 11 of the second and/or third computer system 1b only allows connections 104 with the connection information of the first computer system 1a, and e) the network interface 11 of the first computer system 1a only allows connections 104 with the connection information of the second and/or third computer system 1b, and f) the network interfaces 11 of the first and second and/or third computer system 1a, 1b only allow connection attempts with the respective connection information for a short predetermined time period and after the connection is established or after the predetermined time period has elapsed without a connection being established these network interfaces are not recognizable or reachable for other computer systems.

In a preferred embodiment of the invention it is provided that two, i.e. respectively a first and a second, computer systems 1a1, 1a2 are already connected to a third computer system 1b, and the first and second computer system 1a1, 1a2 by means of the control logic 10 in the third computer system 1b establish a direct connection 203 via the network interface 11, and the method comprises the following further steps: g) transmitting to the second computer system 1a2 the connection information for the telephony interface 12 and network interface 11 of the first computer system 1a1 with a system message 201 via the existing connection to the third computer system 1b; h) checking a call number of the first computer system 1a1 with call numbers stored in the storage space 2 of the second computer system 1a2 and, if the outcome of the check is positive, transmitting to the first computer system 1a1 the connection information 202 for the telephony interface 12 and network interface 11 of the second computer system 1a2 via the existing connection 200 to the third computer system 1b and activating the network interface 11 of the second computer system 1a2, in order to accept connections 203 on the basis of the connection information of the first computer system 1a1; and i) checking the call number of the second computer system 1a2 with the call numbers stored in the storage space 2 in the first computer system 1a1 and, if the outcome of the check is positive, activating the network interface 11 of the first computer system 1a1, in order to establish connections 203 on the basis of the connection information of the second computer system 1a2.

This embodiment also provides according to the invention that j) the network interface 11 of the second computer system 1a2 only allows connections 203 with the connection information of the first computer system 1a1, and k) the network interface 11 of the first computer system 1a1 only allows connections 203 with the connection information of the second computer system 1a2, and l) the network interfaces 11 of the first and second computer system 1a1, 1a2 only allow connection attempts, in particular between 1 and 15, preferably between 2 and 12, in particular preferably between 3 and 10 connection attempts with the respective connection information for a short predetermined time period, in particular for between 1 and 10, preferably between 2 and 7, in particular preferably between 3 and 5 seconds, and after the connection is established or after the predetermined time period has elapsed without a connection being established these network interfaces are not recognizable or reachable for other computer systems.

In a further preferred embodiment of the invention it is provided that in step b) and/or h) the network interface 11 of the second and/or third computer system 1b, 1a2 is activated in order to establish connections on the basis of the connection information of the first computer system 1a, 1a1, and that in step c) and/or i) the network interface 11 of the first computer system 1a, 1a1 is activated in order to accept connections 103 on the basis of the connection information of the second and/or third computer system 1b, 1a2.

In a further preferred embodiment of the invention it is provided that after a connection is established the second and/or third computer system 1b, 1a2 requests an identification of the first computer system 1a, 1a1 compares it with the identification tag stored in the storage space 2 of the second and/or third computer system 1b, 1a2, and if the outcome of the check is positive the connection remains activated and if the outcome of the check is negative the connection is closed and in particular an alarm notification is output.

In a further preferred embodiment of the invention it is provided that after a predetermined number of negative identification attempts, the call number of the first computer system 1a, 1a1 in the storage space 2 of the second and/or third computer system 1b, 1a2 is marked as blocked by the control logic and no more connection information for the first computer system 1a, 1a1 is accepted with this call number.

In a further preferred embodiment of the invention it is provided that the identification tag is a text, a biometric tag, an electronic key or a mechanical key, of which the key information is read by a reading device in the first computer system 1a, 1a1.

In a further preferred embodiment of the method it is provided that the first computer system 1a, 1a1 supplies a security token with the connection information to the second and/or third computer system 1b, 1a2, and this security token is transmitted when the connection is established via the network interface 11 and is checked by the control logic 10 in the first computer system 1a, 1a1, and if the outcome of the check is positive the connection remains activated and if the outcome of the check is negative the connection is closed and in particular an alarm notification is output.

In a further preferred embodiment of the invention it is provided that after a predetermined number of negative connection attempts, the call number of the second and/or third computer system 1b, 1a2 in the storage space 2 of the first computer system 1a, 1a1 is marked as blocked by the control logic 10 and no more connection attempts for the second and/or third computer system 1b, 1a2 are undertaken with this call number.

In a further preferred embodiment of the invention it is provided that two computer systems 1a1, 1a2, which are already connected to a third computer system 1b and have established a direct connection 203, are only authenticated reciprocally via the common third computer system 1b, and the method comprises the following further steps: m) the first computer system 1a1 requests a security token from the third computer system via the connection 200 and sends this on to the second computer system 1a2 via the direct connection 203; n) the second computer system 1a2 passes on the security token to the third computer system 1b via the connection 200; o) the third computer system 1b compares the two security tokens and in each case sends a system message with the result of the comparison to the first and second computer systems 1a1, 1a2, and p) the control logic 10 of these computer systems 1a1, 1a2 checks the system message with the result of the comparison and when the outcome of the check is positive it leaves the connection 203 open and when the outcome of the check is negative closes the direct connection 203 and outputs an alarm message.

In a further preferred embodiment of the invention it is provided that two computer systems carry out a payment process and the method comprises the following further steps: q) the control logic 10 in the computer system 1, 1a1 of a vendor generates a security token, and a computer system 1, 1a2 of a purchaser obtains the security token together with the payment information from the vendor's computer system 1, 1a1 via the direct connection 203; r) the vendor's computer system 1, 1a1 passes on the payment information via the connection 200 together with the security token to the computer system of the payment service; s) the purchaser's computer system 1, 1a2 passes on the payment information via the connection 200 together with the security token to the computer system 1b of the payment service; t) the purchaser's computer system 1, 1a2 authorizes the payment process via the connection 200 in the computer system 1b of the payment service with a PIN, and u) a control logic 10 in the computer system 1b of the payment service compares the security token from the vendor's computer system 1, 1a1 and the purchaser's computer system 1, 1a2, and validates the PIN of the purchaser's computer system 1, 1a2, and concludes the payment process and sends back a positive system message to the vendor's computer system 1, 1a1 and to the purchaser's computer system when the outcome of the check is positive. On the other hand, when the outcome of the check is negative the payment process is interrupted and a negative system message is sent back to the vendor's computer system 1, 1a1 and to the purchaser's computer system 1, 1a2.

In a further preferred embodiment of the invention it is provided that for the payment process between the vendor and the purchaser in a shop or the like the connection 203 is established via NFC, Bluetooth, wireless LAN or wired LAN.

In a further preferred embodiment of the invention it is provided that for the payment process the payment information is transmitted between the vendor's computer system 1, 1a1 and the purchaser's computer system 1, 1a2 in a shop or an online shop, not via a direct connection 203, but via an optical signal (for example Q/R code, barcode, character strings or the like), an acoustic signal (for example modem tones, speech, or the like) or by manual input between the vendor and the purchaser. In order to further improve the authentication and in order to further increase the security, the transmission can optionally also take place bidirectionally, that is to say that not only are data transmitted from the vendor's computer system 1, 1a1 to the purchaser's computer system 1, 1a2 but also from the purchaser's computer system 1, 1a2 to the vendor's computer system 1, 1a1. In this case for online purchasing a second device (1a2, for example a smartphone) can also be used to receive and transmit the payment information from a first device (1a1—for example a PC or notebook). In this context the first device 1a1 (for example PC or notebook) takes on the role of a terminal of the vendor (1a1).

In a further preferred embodiment of the invention the data for the payment process between the vendor's computer system 1, 1a1 and the computer system 1b of the payment service, or between the purchaser's computer system 1, 1a2 and the computer system 1b of the payment service, can also be transmitted by the control logic 10 via other network connections, for example also connections which have not been produced as previously stated. In a further preferred embodiment of the invention it is provided that a text, a biometric tag, an electronic key or a mechanical key, of which the key information is read for example by a reading device in the computer systems 1a, 1b, 1a1, 1a2, can be used for the encryption, identification by PIN, security token and authorization.

In a further preferred embodiment of the invention it is provided that for small quantities of data, in particular for a payment process, the control logic 10 transmits at least a part of the data captured in the preceding steps via the telephony interface 12.

In a further preferred embodiment of the invention it is provided that upon activation of a predetermined signal the control logic 10 passes on data, in particular emails, SMS and fax to computer systems 1 without the aid of other internet services such as DNS and DynDNS.

In a further preferred embodiment of the invention it is provided that the control logic 10 carries out an automatic check as to whether the displayed call number corresponds to the actual subscriber connection.

In a further preferred embodiment of the invention it is provided that connection requests from the first computer systems 1a, 1a1 are distributed by the control logic 10 in a second and/or third computer system 1b, 1a2 to different second and/or third computer systems 1b, 1a2 according to a predetermined criterion, in particular to a number of connections and/or a utilization and/or an availability of the second and/or third computer systems 1b, 1a2 and/or a call number and/or a geographical location.

In a further preferred embodiment of the invention it is provided that a first computer system 1a, 1a1 in a server role in the network processes connection requests or requests for name resolution (for example DNS requests or the like) from computer systems in the network through the control logic 10, and the control logic 10 of the first computer system 1a, 1a1 carries out the exchange of the connection information with a second and/or third computer system 1b, 1a2 as stated above and then produces the connection or sends back the connection parameters (for example IP address, port number, or the like) to the requesting computer systems.

In a further preferred embodiment of the invention it is provided that the control logic 10 of a computer system 1 also passes on the determined connection parameters to a further server system (for example firewall or the like) and this then allows the connections of the computer system 1 or of computer systems from the network with these connection parameters.

In a further preferred embodiment of the invention it is provided that the control logic 10 of the second and/or third computer systems 1b, 1a2 automatically passes on or makes available information and control data to the first computer systems as a function of the connection information.

In a further preferred embodiment of the invention it is provided that the call number of the second and/or third computer system 1b is used for another or an existing telephony service, in particular a fax service and/or an answering machine, and the control logic 10 of the second and/or third computer system 1b compares the call number of the first computer system 1a with the call numbers stored in the storage space 2 of the second and/or third computer system 1b and in the event of conformity it does not activate the telephony service, but transmits the connection data for the second and/or third computer system 1b to the first computer system 1a.

The method described above should preferably be used in conjunction with protocols of other connection-orientated interfaces, in particular with NFC, Bluetooth and WLAN protocols.

LIST OF REFERENCE SIGNS 1 computer systems
1a first computer system (client)
1b third computer system (server)
1a1 first (client) computer system
1a2 second (client) computer system
2 storage space
3 internet
4 telephone network
10 control logic
11 network interface
12 telephony interface
101 first connection
102 second connection
103 third connection
104 fourth connection
200 existing connection
201 system message
202 connection information
203 direct connection

The invention claimed is:

1. A method for addressing, authentication and secure data storage in computer systems comprising at least one first, at least one second and/or at least one third computer system with at least one network interface and at least one telephony interface and at least one storage space for administrative information, in particular for at least one authorized call number and/or at least one subscriber PIN in such a way that the computer systems are programmed with a program reproducing a control logic for controlling the interaction of the aforementioned interfaces, wherein the method comprises the steps of:

a) transmitting, via a first connection, the connection information for the network interface of at least one first computer system via the telephony interface to at least one second and/or third computer system;

b) checking a call number of the first computer system with the call numbers stored in the storage space in the second computer system and, if the outcome of the check is positive, transmitting, via a second connection that is distinct from the first connection, the connection information for the network interface of the second and/or third computer system via the telephony interface to the first computer system and activating the network interface of the second and/or third computer system, in order to accept connections on the basis of the connection information of the first computer system;

c) checking the call number of the second and/or third computer system with the call numbers stored in the storage space in the first computer system and, if the outcome of the check is positive, activating the network interface of the first computer system, in order to establish a connection on the basis of the connection information of the second and/or third computer system;

d) only allowing connections with the connection information of the first computer system by the network interface of the second computer system, and e) only allowing connections with the connection information of the second computer system by the network interface of the first computer system, and wherein f) the network interfaces of the first and the second computer only allow connection attempts with the respective connection information, and after the connection is established, or after a predetermined time period has elapsed without a connection being established, the network interfaces of the first and the second computer systems are not recognizable or reachable for other computer systems.

2. The method according to claim 1, wherein at least in each case the first and the second computer system are already connected to the at least one third computer system, and the first and second computer system in each case by the control logic in the one third computer system establish the connection via the network interface, and further comprising:

g) transmitting to the second computer system the connection information for the telephony interface and network interface of the first computer system with a system message via the existing connection to the third computer system;

h) checking a call number of the first computer system with call numbers stored in the storage space of the second computer system and, if the outcome of the check is positive, transmitting to the first computer system the connection information for the telephony interface and network interface of the second computer system via the existing connection to the third computer system, and activating the network interface of the second computer system, in order to accept connections on the basis of the connection information of the first computer system; and i) checking the call number of the second computer system with the call numbers stored in the storage space in the first computer system and, if the outcome of the check is positive, activating the network interface of the first computer system, in order to establish connections on the basis of the connection information of the second computer system; wherein j) the network interface of the second computer system only allows connections with the connection information of the first computer system;

k) the network interface of the first computer system only allows connections with the connection information of the second computer system, and l) the network interfaces of the first and second computer system only allow connection attempts, between 1 and 15 seconds, and after the connection is established or after the predetermined time period has elapsed without a connection being established the network interfaces are not recognizable or reachable for other computer systems.

3. The method according to claim 2 wherein, in step b) and/or step h) the network interface of the second computer system is activated in order to establish connections on the basis of the connection information of the first computer system, and in step c) and/or i) the network interface of the first computer system is activated in order to accept connections on the basis of the connection information of the second computer system.

4. The method according to claim 2, wherein at least the first and the second computer systems, which in each case are already connected to a common third computer system and have established a direct connection, are only authenticated reciprocally via the common third computer system, and further comprising:
   m) requesting, by the first computer system, a security token from the third computer system via the connection and sending the security token on to the second computer system via the direct connection;
   n) passing on, by the second computer system, the security token to the third computer system via the connection;
   o) comparing, by the third computer system, the two security tokens, and in each case sending a system message with a result of the comparison to the first and/or the second computer systems, and
   p) checking, with the control logic of the first and/or the second computer system, the system message with the result of the comparison, and when the outcome of the check is positive, leaving the connection open, and when the outcome of the check is negative, closing the direct connection and outputs an alarm message.

5. The method according to claim 2, the first and the second computer system with the addition of the third computer system carry out a payment process, and further comprising:
   q) generating, with the control logic in the first computer system a security token, and obtaining by the second computer system, the security token together with payment information from the first computer system;
   r) passing on, by the first computer system, the payment information via the connection together with the security token to the third computer system;
   s) passing on, by the second computer system, the payment information via the connection together with the security token to the third computer system, in particular a computer system of a payment service;
   t) authorizing, by the second computer system, the payment process via the connection in the third computer system with a PIN, and
   u) comparing, with the control logic in the third computer system, the security token from the first computer system and the second computer system, a purchaser's computer system, and validating the PIN of the second computer system, and concluding the payment process and sending back a positive system message to the first computer system and to the second computer system when the outcome of the check is positive, and sending back a negative system message to the first computer system and the second computer system when the outcome of the check is negative.

6. The method according to claim 5, the first computer system is a vendor's computer system, the second computer system is a purchaser's computer system, a shop computer system or an online shop computer system, and/or wherein the third computer system is a payment service computer system and/or the connection the payment process is established via NFC, Bluetooth, wireless LAN or wired LAN.

7. The method according to claim 6, wherein, for the payment process between the first computer system and the second computer system, the payment information is not transmitted via a direct connection and is transmitted via an optical signal, an acoustic signal or by manual input, wherein, for an online purchase, a second device which forms or provides the second computer system is used, in particular a smartphone for receiving and transmitting the payment information from a first device which forms or provides the first computer system.

8. The method according to claim 6, wherein the control logic transmits the data for the payment process between the first computer system and the third computer system or the second computer system and the third computer system, via other network connections.

9. The method according to claim 6, wherein a text, a biometric tag, an electronic key or a mechanical key, of which key information is read by a reading device in computer systems is used for encryption, identification by PIN, security token and authorization.

10. The method according to claim 6, wherein, for predetermined quantities of data, a first control logic transmits at least a part of the data captured via the telephony interface.

11. The method according to claim 6, wherein, upon activation of a predetermined signal, a first control logic passes on data to computer systems free-of the aid of other internet services.

12. The method according to claim 6, wherein a first control logic carries out an automatic check as to whether the displayed call number corresponds to an actual subscriber connection.

13. The method according to claim 6, wherein connection requests from the first computer systems are distributed by a second control logic in a second and/or third computer system to different second and/or third computer systems according to a predetermined criterion, including at least one of a number of connections, a utilization and/or an availability of the second and/or third computer systems, a call number, and a geographical location.

14. The method according to claim 6, wherein the first computer system is arranged in a server role in the network processes connection requests or requests for name resolution from computer systems in the network through a first control logic, and the first control logic of the first computer system carries out the exchange of the connection information with the second and/or the third computer system, and then produces the connection or sends back connection parameters to the requesting computer systems.

15. The method according to claim 14, wherein the first control logic of at least one computer system passes on the determined connection parameters to at least one further computer system, and then allows the connections of the first computer system or the further computer systems from the network with the connection parameters.

16. The method according to claim 14, wherein a second control logic of the second and/or the third computer system automatically passes on, or makes available, information and control data to the first computer system, as a function of the connection information.

17. The method according to claim 1 wherein, after a connection is established, the second computer system requests an identification of the first computer system, compares the identification with an identification tag stored in the storage space of the second computer system, and if the outcome of the check is positive, then the connection remains activated and if the outcome of the check is negative the connection is closed and in particular an alarm notification is output.

18. The method according to claim 17, wherein, after a predetermined number of negative identification attempts, the call number of the first computer system in the storage space of the second computer system is marked as blocked by the control logic and no more connection information is accepted for the first computer system with the call number.

19. The method according to claim 17, wherein the identification tag is a text, a biometric tag, an electronic key or a mechanical key, of which key information is read by a reading device on the first, second and/or third computer system.

20. The method according to claim 17, wherein the first computer system supplies a security token with the connection information to the second and/or third computer system, and this security token is transmitted when the connection is established via the network interface and is checked by the control logic in the first computer system, and if the outcome of the check is positive the connection remains activated and if the outcome of the check is negative the connection is closed and in particular an alarm notification is output.

21. The method according to claim 20, wherein, after a predetermined number of negative connection attempts, the call number of the second computer system in the storage space of the first computer system is marked as blocked by the control logic and no more connection attempts are accepted for the second computer system with the call number.

22. The method according to claim 1, wherein the call number of the second and/or the third computer system is used for another or an existing telephony service, and the control logic of at least the second and/or third computer system compares the call number of at least the first computer system with the call numbers stored in the storage space of the second and/or third computer system, and in the event of conformity, the second and/or the third computer system does not activate the telephony service, and transmits the connection data for the second and/or third computer system to the first computer system.

23. The method according to claim 1, wherein for computer systems selected from at least one of the first computer system, second computer system, and third computer system, which lie geographically close together, the connection information for the network interface is transmitted alternatively using signals, acoustic signals, manual inputs and/or by secure connections previously produced in another way between the computer systems.

24. The method according to claim 1 further comprising, providing communication protocols of other connection-orientated interfaces for use in interconnecting at least some of the first computer system, the second computer system, and the third computer system, including at least one of NFC, Bluetooth and WLAN protocols.

25. A method for authenticating one or more computer systems, comprising:
    transmitting, via a first telephony connection, first connection information associated with a first network interface of a first computer system to a second computer system;
    checking a first call number of the first computer system against a first plurality of call numbers stored at a storage associated with the second computer system and, if the outcome of the check is positive, authenticating the first computer system via a second telephony connection that is distinct from the first telephony connection, and transmitting second connection information associated with a second network interface of the second computer system to the first computer system and activating the second network interface in order to accept connections on the basis of the first connection information;
    checking a second call number of the second computer system against a second plurality of call numbers stored at a storage associated with the first computer system and, if the outcome of the check is positive, activating the first network interface of the first computer system in order to establish a connection on the basis of the second connection information of the second computer system;
    only allowing a data connections or a data connection attempt with the first connection information of the first computer system by the second network interface of the second computer system, and
    only allowing a data connections or a data connection attempt with the second connection information of the second computer system by the first network interface of the first computer system, and
    wherein after the data connection is established, or after a predetermined time period has elapsed without the data connection being established, the first network interface and the second network interface are not recognizable or reachable by other computer systems.

* * * * *